(12) United States Patent
Saito et al.

(10) Patent No.: US 7,451,261 B2
(45) Date of Patent: Nov. 11, 2008

(54) DATA STORAGE DEVICE AND CONTROL METHOD WITH BUFFER CONTROL THEREOF

(75) Inventors: Takahiro Saito, Kanagawa (JP);
Takayuki Yamaguchi, Kanagawa (JP);
Atsushi Kanamaru, Kanagawa (JP);
Hiromi Kobayashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 317 days.

(21) Appl. No.: 11/317,029

(22) Filed: Dec. 22, 2005

(65) Prior Publication Data
US 2006/0153033 A1    Jul. 13, 2006

(30) Foreign Application Priority Data
Dec. 27, 2004    (JP)    ............................. 2004-377827

(51) Int. Cl.
*G06F 12/00*    (2006.01)
*G06F 5/00*    (2006.01)

(52) U.S. Cl. ........................ 711/3; 711/100; 711/109; 711/113; 710/52; 710/53; 710/56

(58) Field of Classification Search .................. 711/3, 711/100, 109, 113; 710/52, 53, 56
See application file for complete search history.

(56) References Cited

U.S. PATENT DOCUMENTS

| | | | | |
|---|---|---|---|---|
| 5,948,082 | A * | 9/1999 | Ichikawa | ...................... 710/52 |
| 6,782,461 | B2 * | 8/2004 | Lam | ........................... 711/170 |
| 7,085,087 | B2 * | 8/2006 | Fukuhisa et al. | .............. 360/55 |
| 7,146,458 | B2 * | 12/2006 | Smirnov et al. | ............. 711/110 |

FOREIGN PATENT DOCUMENTS

| | | |
|---|---|---|
| JP | 07-093888 | 4/1995 |
| JP | 2003-122631 | 4/2003 |

* cited by examiner

*Primary Examiner*—Jane A Lane
(74) *Attorney, Agent, or Firm*—Townsend and Townsend and Crew LLP; Patrick Duncan

(57) ABSTRACT

Embodiments of the invention improve the cache hit ratio of read data. A hard disk drive (HDD) according to an embodiment of the present invention determines whether the read buffer should be used in its entirety or the partial continuous space should be used to read read-data from the magnetic disk. When the HDD determines use of the partial continuous space, the HDD specifies the sub-buffer which is a continuous space wherein the leading-end position and the trailing-end position are coupled to each other, and executes data writing to the sub-buffer in parallel with data reading from the sub-buffer and transmission thereof to the host. The sub-buffer capacity coincides with the data length of the back data.

20 Claims, 8 Drawing Sheets

Fig. 9

| Identification Number | LBA | Data Length | Start Position in Buffer |
|---|---|---|---|
| 0 | 1000h | 100 h | 300h |
| 1 | 2000h | 80h | 400h |
| 2 | 3000h | 100h | 480h |
| . | . | . | . |
| . | . | . | . |
| . | . | . | . |

DATA STORAGE DEVICE AND CONTROL METHOD WITH BUFFER CONTROL THEREOF

CROSS-REFERENCES TO RELATED APPLICATIONS

This application claims priority from Japanese Patent Application No. JP2004-377827, filed Dec. 27, 2004, the entire disclosure of which is incorporated herein by reference.

BACKGROUND OF THE INVENTION

The present invention relates to a data storage device, and more specifically to a buffer control method in a data storage device.

Data storage devices using various types of media such as optical disks, magnetic tapes and semiconductor memories are known in the art. Among them, hard disk drives (hereinafter referred to as HDDs) have become popular as storage devices for computers to such an extent that they are one type of the storage devices indispensable for today's computers. Further, not limited to computer systems, HDDs are expanding more and more in application because of its excellent characteristics. For example, HDDs are used for moving picture recording/reproducing devices, car navigation systems, cellular phones, and removable memories for use in digital cameras.

Each magnetic disk used in HDDs has a plurality of tracks formed concentrically and each track is partitioned into a plurality of sectors. Sector address information and user data are stored in each sector. Either data write to a sector or data read from the sector is enabled by a magnetic head which accesses the desired sector according to the sector address information. In a data read operation, a signal read out by the head from a magnetic disk is subjected to waveform shaping, decoding processing and other prescribed signal processing by a signal processing circuit before being transmitted to the host. Likewise, data transferred from the host is subjected to prescribed signal processing by the signal processing circuit and then written to the magnetic disk.

Read data that is read from the magnetic disk is temporarily stored in a buffer before being transmitted to the host. In the buffer, data that was read from the magnetic disk in the past is stored, and when data required from the host is cached in the buffer, the data stored in the buffer is transmitted to the host without making an access to the magnetic disk. With such arrangement, it is possible to improve performance of the HDD.

Several methods related to buffer control of read data have been known for improving the HDD performance. One of the methods is disclosed in Patent Document 1 (Japanese Patent Laid-Open No. 2003-122631), wherein an HDD includes a data buffer comprising a main memory and an auxiliary memory to store read or written data. At the time of initialization, data of a specified sector such as an alternating process accompanying a seek operation will be read into the auxiliary memory in advance. With such arrangement, HDD performance can be improved.

BRIEF SUMMARY OF THE INVENTION

As technologies to buffer read data, a technology using a ring buffer has been known in the art. An HDD stores data read from a magnetic disk in the ring buffer one by one in a time-series order. When the buffer is used up to the trailing position, the leading position of the buffer is resumed. HDDs that have been known so far include an HDD in which a ring buffer stores both of read and write data, and an HDD which incorporates an independent ring buffer for storing read data and an independent ring buffer for storing write data.

For a case where write data and read data are stored in a ring buffer, however, when a read command having a data length exceeding the size of a free space is received, for the purpose of preventing erasure of write data, it is not possible to execute a read process until writing of the write data to the magnetic disk is completed. Otherwise, in an HDD which includes respective different buffers for reading and writing data, when a read command requesting read data having a sizable data length is issued, much of cache data existing in the buffer will be overwritten. Further, since the transmitted data is cached in the host, the HDD buffer will cache data that is redundant with the cache data in the host. Consequently, the cache hit rate to the read command from the host will decrease, thus resulting in deteriorated performance of the HDD.

The present invention has been achieved in view of the above-described background, and a feature of the invention is to improve the cache hit rate of read data in a buffer of a data storage device.

According to a first aspect of the present invention, there is provided a data storage device that transmits read data read from a recording medium to a host. The data storage device comprises: a buffer having a leading end and a trailing end coupled to each other and enabling continuous recording of data from a write start position designated by a pointer; and a controller for controlling data recording to the buffer. The controller determines whether the buffer should be used as a whole or part of continuous space of the buffer should be used to read the read data from the recording medium; specifies, if using the part of continuous space is determined, a sub-buffer which is a continuous space formed by coupling a leading-end position and a trailing-end position to each other; and executes writing of data from the recording disk to the sub-buffer in parallel with reading of the read data to the host. With the arrangement to select use of the buffer as a whole or use of partial space, it is possible to improve the cache hit rate.

Consistency of the sub-buffer and the part of continuous space forms a favorable mode. By achieving the aspect, it is possible to reduce the amount of existing cache data to be overwritten and erased in the buffer. Further, referring to the data storage device of the first embodiment, it is preferable that the data to be read from the recording medium contains, in addition to read data to the host, back data that is stored in the back position of the read data in the recording medium, and the capacity of the sub-buffer coincides with the data length of the back data. With such an arrangement, it is possible to reduce the amount of existing cache data to be erased and leave and keep the back data as cache data.

It is preferable that the data to be read from the recording medium contain, in addition to read data to the host, back data that is stored in the back position of the read data in the recording medium, and the capacity of the sub-buffer is smaller than data to be read from the recording medium and is larger than the data length of the back data. With such an arrangement, it is possible to leave and keep the back data as cache data.

It is preferable that the data to be read from the recording medium contain, in addition to read data to the host, back data that is stored in the back position of the read data in the recording medium, and that the capacity of the sub-buffer coincide with the data length of the back data. With such an arrangement, it is possible to leave and keep the back data as cache data.

It is preferable that the data to be read from the recording medium contain, in addition to read data to the host, back data that is stored in succession to the back position of the read data in the recording medium as well as the front data that is stored in the front position of the read data in the recording medium, that the capacity of the sub-buffer exceed the data length of the back data, and that the front data be written in the front space of the sub-buffer and the back data be written after writing the read data in the sub-buffer. With such an arrangement, it is possible to leave and keep the front data and the back data as cache data.

From the view point of performance, it is preferable that the data storage device include a write buffer to store write data from the host, in addition to the above-stated buffer to store data from the recording disk.

It is preferable that the controller be designed to determine to use the partial continuous space when the expected data length of data to be read from the recording medium is larger than a reference value. In addition, in terms of achieving control according to data length, it is preferable that the reference value be a predetermined fixed value and the value be chosen among values indicating about 50% or over of the read buffer capacity. Using the partial continuous space when the data length is sizable enables to avoid much of the existing cache data from being erased.

It is preferable that the controller be designed to determine to use the partial continuous space when the expected data length of data to be read from the recording medium is larger than the read buffer capacity. With such an arrangement, it is possible to avoid all the existing cache data from being erased.

The controller determines to use the partial continuous space when the expected data length of data read from the recording medium is larger than the capacity of the continuous free space located next to the end position of previous data writing to the read buffer and the data length is larger than the reference value. With such an arrangement, it is possible to avoid much of the existing cache data from being erased.

It is preferable that the controller be designed to use the fact that the command associated with the read data is sequential read as one of criteria for determining the use of partial continuous space in the read buffer. With such an arrangement, it is possible to leave and keep data other than the data transmitted to the host as cache data.

It is preferable to design that the data storage device reads the back data stored in the back position of the read data in the recording medium together with the read data to be transmitted to the host from the recording disk, and that the controller determines, when at least part of read data of sequential read is not contained in the back data at the time of previous data reading from the recording disk, to use the partial continuous space in the read buffer for reading the read data of the sequential read from the recording disk. With such an arrangement, it is possible to leave and keep data other than the data transmitted to the host as cache data.

According to another aspect of the present invention, there is provided a control method of a data storage device which includes a buffer having a leading end and a trailing end coupled to each other and enabling continuous recording of data from a write start position as designated by a pointer. The method comprises the steps of: receiving a read command from a host; determining reading read data associated with the read command from a recording medium; determining whether the buffer should be used as a whole or part of continuous space in the buffer should be used to store data, including the read data, read from the recording medium; writing data, when it is determined to use the partial continuous space, from the recording medium to a sub-buffer which is a continuous space formed by coupling a leading-end position and a trailing-end position to each other as defined within the partial continuous space; and in parallel with the data writing to the sub-buffer, reading the read data from the sub-buffer to the host. By choosing use of the buffer as a whole or use part of the buffer, it is possible to improve the cache hit rate.

It is preferable, based on the data length of data to be read from the recording medium, to determine that the buffer is used as a whole or the partial continuous space in the read buffer is used. By choosing data to be kept as cache data according to data length, it is possible to improve the cache hit rate.

It is preferable that the data to be read from the recording medium should contain, in addition to the read data to the host, back data stored in the back position of the read data in the recording medium, and that the capacity of the sub-buffer should coincide with the data length of the back data. With such an arrangement, it is possible to leave and keep the back data as cache data and to reduce the amount of existing cache data to be erased.

It is preferable that the data to be read from the recording medium should contain, in addition to the read data to the host, the back data stored in the back position of the read data in the recording medium and the front data stored in the front position of the read data in the recording medium, and that the capacity of the partial continuous space should be at least a value which is the sum of the data length of the back data and the data length of the front data. With such an arrangement, it is possible to leave and keep the back data and the front data as cache data.

According to the present invention, it is possible to improve the cache hit rate of read data in a buffer of a data storage device.

BRIEF DESCRIPTION OF THE DRAWINGS

FIG. 9 is a diagram showing an example of a cache table for read buffer control in an HDD according to an embodiment of the invention.

DETAILED DESCRIPTION OF THE INVENTION

Figure 1:
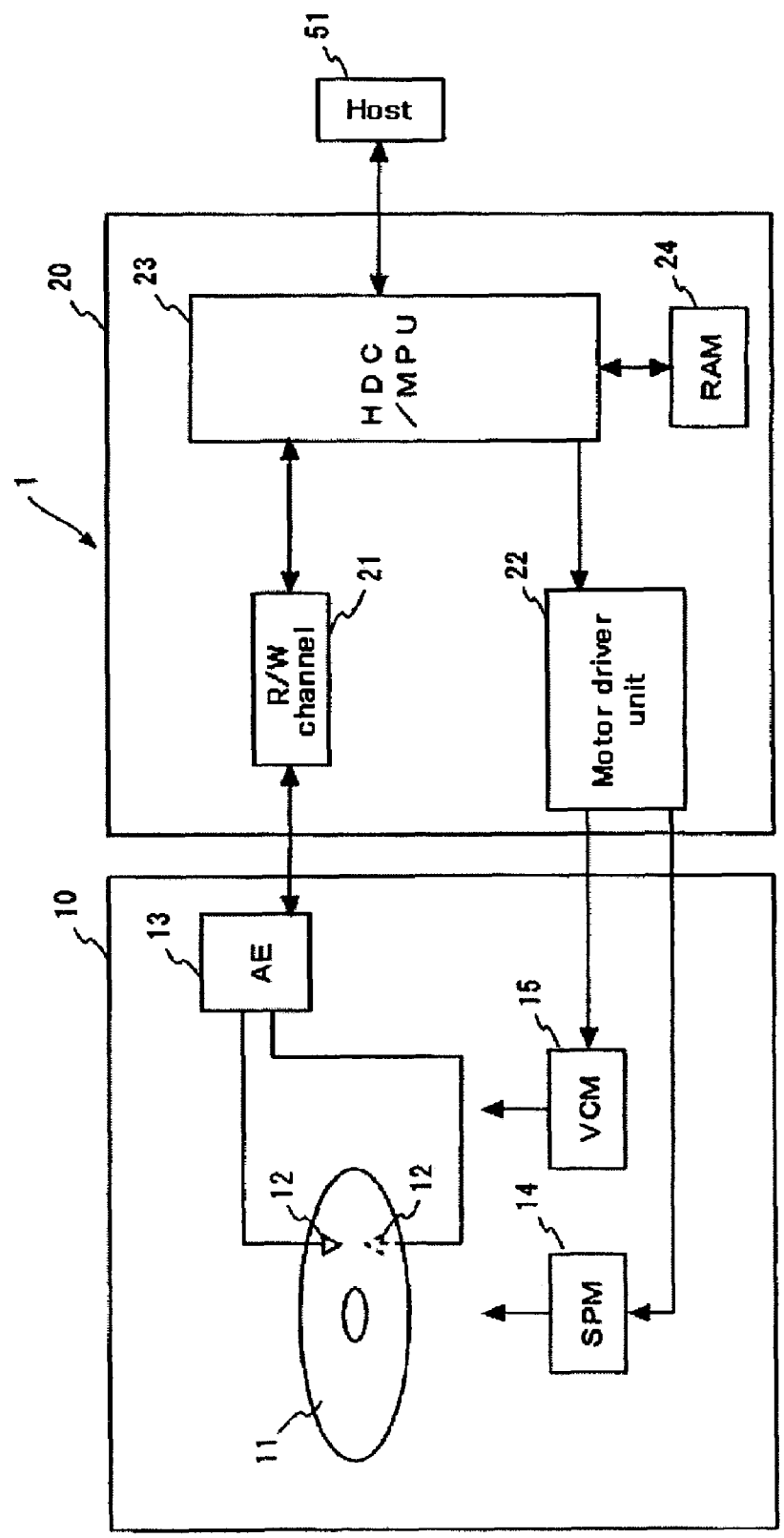
FIG. 1 is a block diagram showing a schematic overall configuration of an HDD according to an embodiment of the invention.

Hereinafter, specific embodiments to which the present invention is applicable will be described. To clearly articulate the description, descriptions and drawings stated hereunder are omitted and simplified as appropriate. It should also be noted that, in the drawings, the same reference numerals are given to the same components, and redundant descriptions thereof are omitted as required to clearly articulate the description.

Hereinafter, specific embodiments to which the present invention is applied will be described in detail with reference to the accompanying drawings. The present invention relates to buffer control in a data storage device. In the embodiment, the buffer control according to the present invention will be described by taking a hard disk drive (HDD) which is one of the data storage device as an example. To make the present invention more understandable, outline of the overall configuration of the HDD will be described first. FIG. 1 is a block diagram showing a schematic configuration of an HDD 1 according to the embodiment. As shown in FIG. 1, the HDD1 includes a magnetic disk 11 which is an example of recording media, a head element 12, an arm electronics (AE) 13, a spindle motor (SPM) 14 and a voice coil motor (VCM) 15 within a hermetically-sealed enclosure 10.

The HDD 1 is provided with a circuit board 20 which is fixed on the outer side of the enclosure 10. The circuit board 20 has, thereon, a read/write channel (R/W channel) 21, a motor driver unit 22, a hard disk controller (HDC)/MPU integrated circuit (hereinafter referred to as HDC/MPU) 23, a RAM 24 as an example of memories, and other ICs. It should be noted that circuit configurations can be integrated into one IC or can be mounted by dividing the circuit configurations into a plurality of ICs.

Write data from an external host 51 is received by the HDC/MPU 23 and is written on the magnetic disk 11 by the head element 12 via the R/W channel 21 and the AE 13. Further, read data stored on the magnetic disk 11 is read by the head element 12, and the data thus read is output to the external host 51 from the HDC/MPU 23 via the AE 13 and the R/W channel 21.

Next, each component of the HDD 1 will be described. The magnetic disk 11 is fixed on the SPM 14. The SPM 14 rotates the magnetic disk 11 at a prescribed speed. The motor driver unit 22 drives the SPM 14 according to control data from the HDC/MPU 23. The magnetic disk 11 of the embodiment is provided on both sides thereof with recording surfaces on which data are recorded. The head elements 12 are provided to be associated with the respective recording surfaces.

Each head element 12 is fixed on a slider (not shown in FIG. 1). Further, the slider is fixed on an actuator. The actuator is coupled to the VCM 15, and the actuator is turned around its rotating axis to move the head elements 12 in a radial direction on the magnetic disk 11. The motor driver unit 22 drives the VCM 15 according to control data from the HDC/MPU 23.

Typically, a write head which converts electric signals to magnetic fields according to write data to be stored on the magnetic disk 11 and a read head which converts magnetic fields from the magnetic disk 11 to electric signals are formed on the head elements 12 as an integral part. It should be noted that at least one magnetic disk 11 is sufficient to be prepared, and the recording surface can be formed on a single side or double sides of the magnetic disk 11.

Next, each circuit will be described. The AE 13 selects one head element 12, among a plurality of head elements 12, through which data accessing is executed, amplifies a read signal to be read by the head element 12 thus selected at a constant gain (pre-amplifying) and sends the signal to the R/W channel 21. Further, the AE 13 sends a write signal from the R/W channel 21 to the selected head element 12.

The R/W channel 21 executes a write process on the data transferred from the host 51. In the write process, the R/W channel 21 executes a code modulation on the write data supplied by the HDC/MPU 23 and further converts the code-modulated write data into a write signal (current), thereby supplying the signal to the AE 13. Further, when supplying data to the host 51, the R/W channel 21 executes a read process. In the read process, the R/W channel 21 amplifies the read signal supplied from the AE 13 so that the signal amplitude can be constant, extracts data out of the read signal thus acquired, and executes a decoding process. The data to be read includes user data and servo data. The decoded read data is supplied to the HDC/MPU 23.

The HDC/MPU 23 is a circuit in which an MPU and an HDC are integrated into one chip. The MPU operates according to micro-codes loaded in the RAM 24, in which, when the HDD 1 starts up, data that is required for control and data processing, in addition to micro-codes that run on the MPU, are loaded from the magnetic disk 11 or a ROM (not shown in FIG. 1). The HDC/MPU 23 executes overall control of the HDD 1 in addition to processes that are required for data processing such as positioning control of the head element 12, interface control and defect management.

The HDC/MPU 23 transmits read data from the magnetic disk 11 obtained from the R/W channel 21 to the host 51. The read data from the magnetic disk 11 is temporarily stored in a read buffer in the RAM 24 and is then transferred to the host 51 via the HDC/MPU 23. On the other hand, write data from the host 51 is temporarily stored in a write buffer in the RAM 24 and is then transferred to the magnetic disk 11 with a prescribed timing via the HDC/MPU 23.

Next, the read buffer control of the HDD 1 according to the embodiment will be described. The HDD 1 according to the embodiment includes a read buffer and a write buffer independently. Further, one read buffer deals with all read data. The HDD 1 performs prefetching and pre-reading when reading read data associated with a read command (data to be transferred to the host 51) from the magnetic disk 11. More specifically, the HDD 1 reads out from the magnetic disk 11 back data (prefetching) that is recorded after the read data and front data that is recorded before the read data as well as the read data. It should be noted that the front data and the back data are typically recorded on the magnetic disk 11 in succession to the read data.

Figure 2:
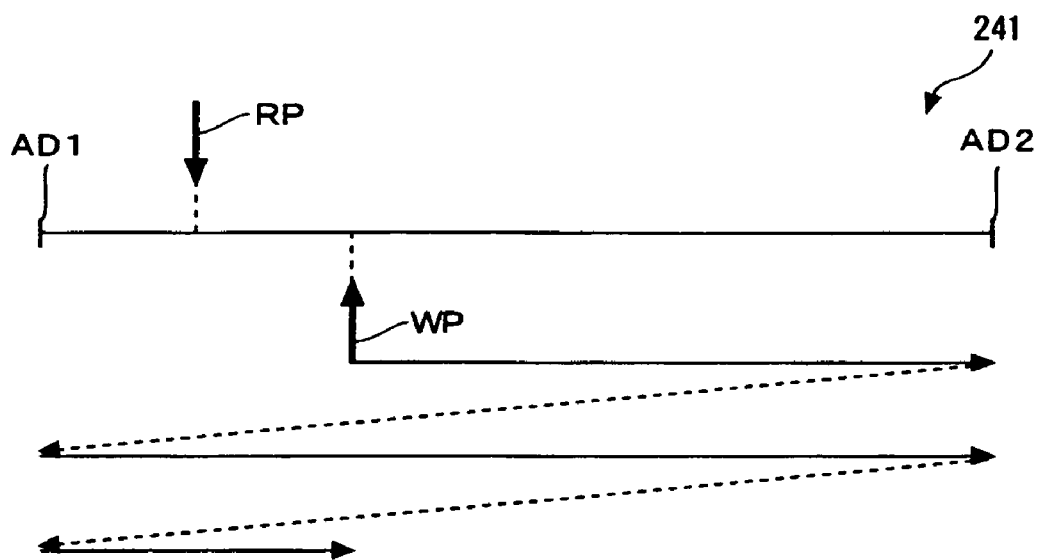
FIG. 2 is a schematic diagram explaining a read buffer according to an embodiment of the invention.

The HDD 1 determines, based on the data to be read from the magnetic disk 11, whether the read buffer is used as a whole or the partial continuous space thereof is used. FIG. 2 shows a read buffer conceptually to describe the read buffer control according to the embodiment. As shown in FIG. 2, a read buffer 241 of the embodiment has a buffer configuration wherein the leading-end address AD 1 and the trailing-end address AD 2 thereof are coupled to each other.

The read buffer 241, after storing data read from the magnetic disk 11 up to the trailing-end address AD 2, stores the data in succession to the leading-end address AD 1 from the trailing-end address AD 2. More specifically, the read buffer 241 is capable of storing data associated with a read command across the trailing-end address AD 2 and the leading-end address AD 1. Here, the data associated with a read command shall include front data FD and/or back data BD in addition to read data RD when prefetching and pre-reading is executed. As stated above, by coupling the leading-end address AD 1 to the trailing-end address AD 2 of the read buffer 241, it is possible to use the read buffer 241 efficiently.

In addition, the read buffer 241 addresses data in units of sector, which is a data processing unit of the HDD 1, and stores read data associated with a read command in a series of continuous addresses. The read buffer 241 of the embodiment is not divided into a plurality of segments but is configured as a continuous section. Therefore, the read buffer 241 can store data associated with a read command in a continuous free space which can be started at a random address. By configuring a read buffer in a manner that the buffer is not partitioned by a plurality of segments but forms a continuous section, it is possible to improve efficiency in using the buffer space.

Writing data to the read buffer 241 is started at an address (position) as directed by a write pointer WP. Likewise, reading of read data RD to the host 51 is started at an address (position) as directed by a read pointer RP. Here, in conventional read buffer control, since the whole read buffer was always used as a continuous space, when reading sizable data from the magnetic disk 11, data that has already been cached in the read buffer is overwritten, which deteriorated the cache hit rate.

In contrast, with the HDD 1 according to the embodiment, data read from the magnetic disk 11 is stored by using partial continuous space of a read buffer as required. Further, a sub-buffer constituting a continuous space by coupling the leading-end position to the trailing-end position is formed to execute writing of data read from the magnetic disk 11 to the sub-buffer and reading of read data to the host 51 in parallel to each other. As stated above, by selecting use of the read buffer 241 as a whole and use of the partial continuous space thereof, it is possible to realize efficient read buffer control.

Figure 3:
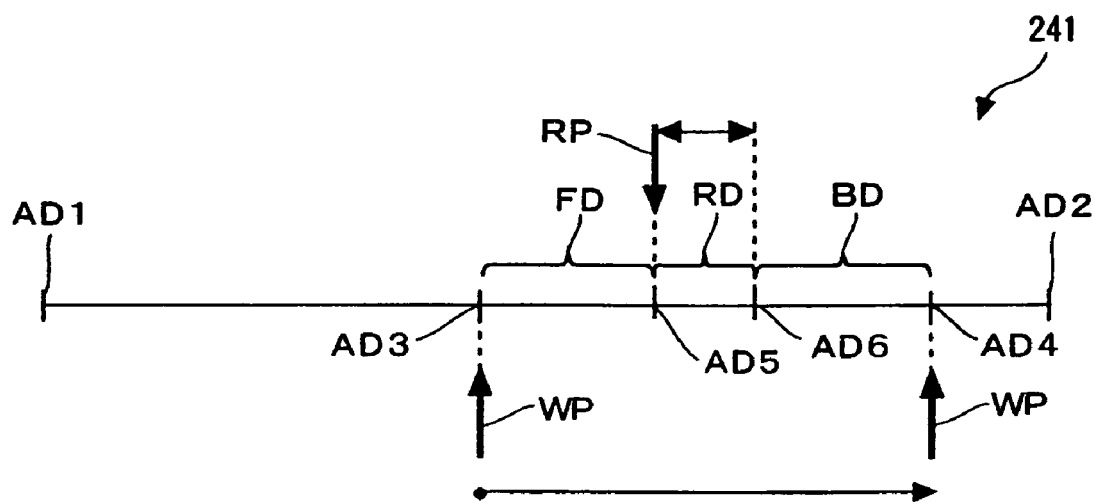
FIG. 3 is a schematic diagram describing a control method for a case where a read buffer is used as a whole according to an embodiment of the invention.

FIG. 3 shows a case where the read buffer 241 is used as a whole in responding to a read command from the host 51. As shown in FIG. 3, data read from the magnetic disk 11 is written in a space starting from a write start position AD 3 to a write end position AD 4 as directed by the write pointer WP. After the writing is completed, the write pointer is set at the write end position AD 4. With the example, in responding to a read command from the host 51, front data FD and back data BD are read from the magnetic disk 11 in addition to the read data RD.

Data read from the magnetic disk 11 is sequentially recorded from the write start position AD 3 to the write end position AD 4 as directed by the write pointer WP in a manner that addresses will increase continuously (toward the right-hand direction of the drawing). It should be noted that, when the recorded data reaches the trailing-end position AD 2 of the read buffer 241, the data is continued to be recorded starting at the leading-end position AD 1. The read data RD is stored in a space from an address position AD 5 to an address position AD 6. The read pointer RP directs the read start position AD 5, and the read data RD read as directed by the read pointer RD is transferred to the host 51. When the sequence is terminated, newly written front data FD, read data RD and back data BD will remain in the read buffer 241.

Figure 4:
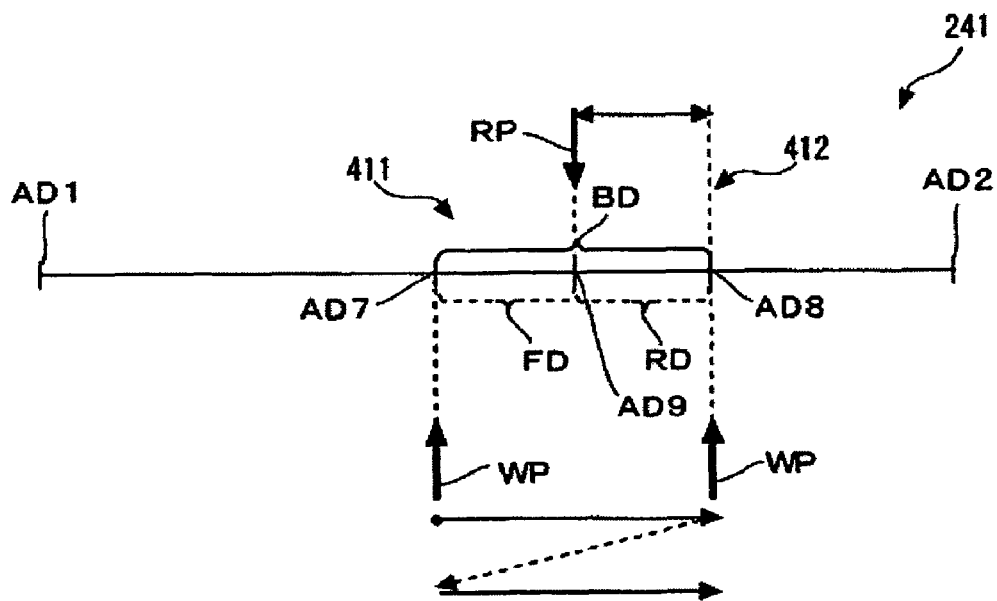
FIG. 4 is a schematic diagram describing a control method for a case where partial continuous space of a read buffer is used according to another embodiment of the invention.

FIG. 4 shows an example in which a partial continuous space of the read buffer 241 is used. With the example in FIG. 4, read data from the magnetic disk 11 is stored in a partial continuous space 411 from a leading-end position AD 7 to a trailing-end position AD 8. In addition, with the embodiment, a sub-buffer 412 is defined so that the sub-buffer will coincide with the partial continuous space. As stated above, the leading-end position AD 7 and the trailing-end position AD 8 of the sub-buffer 412 are coupled to each other.

The write pointer WP initially designates the leading-end position AD 7 of the partial continuous space 411 (and the sub-buffer 412) as the write start position. First, front data FD is written in the read buffer 241 from a position as directed by the write pointer WP. The front data FD is written in a space up to an address position AD 9. Thereafter, read data RD is recorded in a space from the address position AD 9 to the trailing-end position AD 8 of the partial continuous space 411 (and the sub-buffer 412). It should be noted that, when the data length of the read data RD is short, the read data RD is stored in a space up to an address located before the trailing-end position AD 8.

When data is recorded up to the trailing-end position AD 8, data read from the magnetic disk 11 is recorded from the leading-end position AD 7 of the sub-buffer 412. In this embodiment, the back data BD is recorded in a space from the leading-end position AD 7 to the trailing-end position AD 8. The read buffer 241 records the back data BD in a manner to overwrite the front data FD and the read data RD. For this purpose, the HDD 1 executes reading of the read data RD to be transferred to the host 51 in parallel with writing of data from the magnetic disk 11. The read pointer RP designates the address position AD 9, thereby starting reading of the read data RD. Then, all read data RD that are recorded in a space from the AD 9 to AD 8 is transferred to the host 51.

As stated above, since the read buffer 241 overwrites the front data FD and the read data RD with the back data BD, the back data BD will be kept as cache data in the read buffer 41. Here, with the example, the sub-buffer capacity coincides with the data length of the back data BD. As a result, all back data BD can be kept as cache data in the read buffer 241.

The read data RD has already been transferred to the host 51 and can therefore be cached in the host 51. In this respect, it is unlikely that a command is issued to the HDD 1 regarding the read data RD. Therefore, the read buffer 241 can improve the cache hit rate by storing data other than the read data transferred as cache data.

As stated above, by using the sub-buffer 412, the amount of existing cache data that is overwritten and erased by the read data to be transferred to a host can be reduced. With such an arrangement, it is possible to improve the cache hit rate. Further, since it is possible to leave and keep back data BD not yet transferred to the host 51 in the sub-buffer 412, the cache hit rate can be improved. It should be noted that, to leave and keep all back data BD, the sub-buffer 412 can have the size longer than the data length of the back data BD. However, to prevent existing cache data from being erased as much as possible, it is preferable that the capacity of the sub-buffer 412 should coincide with the data length of the back data BD. It should also be noted that it is preferable to leave and keep all back data BD as cache data, but the buffer control may be designed to leave and keep only part of the back data BD.

Figure 5:
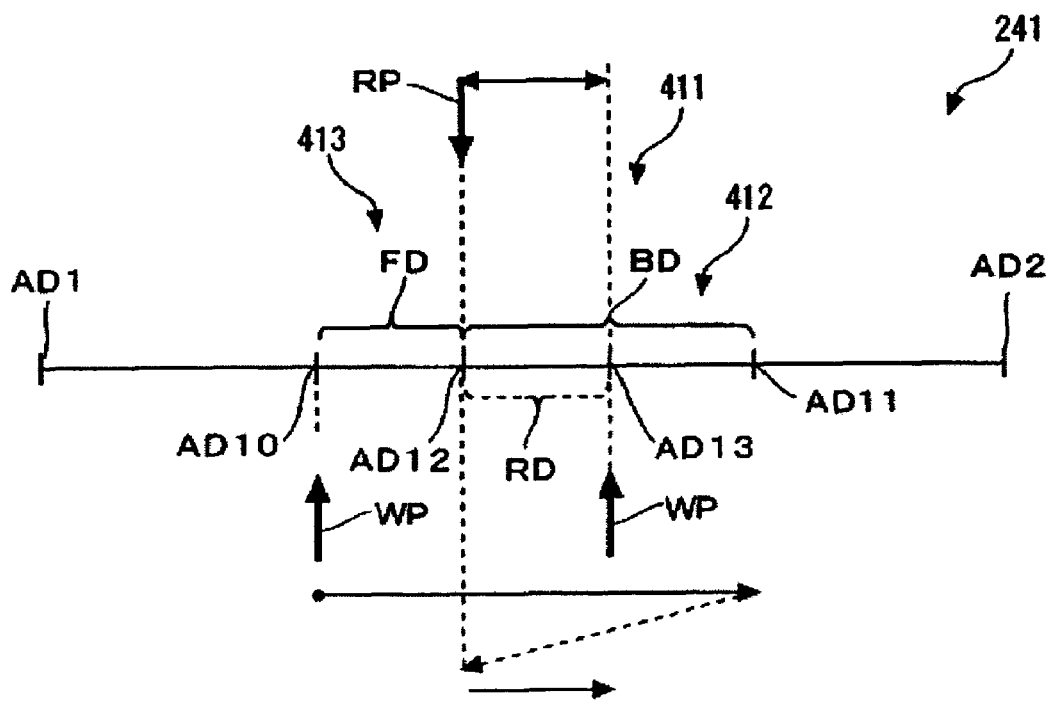
FIG. 5 is a schematic diagram describing another control method for a case where partial continuous space of a read buffer is used according to another embodiment of the invention.

In the example shown in FIG. 4, the partial continuous space 411 coincides with the sub-buffer 412. However, the partial continuous space 411 may be provided with a space in addition to the space of the sub-buffer 412. FIG. 5 shows a schematic diagram of a read buffer 241 which includes a sub-buffer 412 and an additional space 413 in the partial continuous space 411. The partial continuous space 411 that is selected from the read buffer 241 is secured as a space located between address positions AD 10 and AD 11. In the partial continuous space 411, the sub-buffer 412 is a space that is clearly defined by address positions AD 12 and AD 11. The address position AD 12 corresponds to the leading-end position of the sub-buffer 412, the address position AD 11 corresponds to the trailing-end position thereof, and the two positions are coupled to each other. The additional space 413 is formed in between the address positions AD 10 and AD 12.

When reading data from the magnetic disk 11 is started, the write pointer WP indicates the address position AD 10. Front data FD read from the magnetic disk 11 is recorded in the additional space 413 from the address position AD 10 to the address position AD 12. Thereafter, read data RD is recorded in the sub-buffer 412 from the address position AD 12. The read data RD is recorded in a space from the address position AD 12 to the address position AD 13.

When writing of the read data RD is completed, writing of back data BD is initiated at the address position AD 13. When the back data BD is recorded up to the trailing-end position AD 11 of the sub-buffer 412 (the partial continuous space 411), the back data BD is continuously recorded at the leading-end position AD 12 of the sub-buffer 412. In the space beyond the address position AD 12, read data has already been recorded, which is, however, overwritten with the back data BD. Thereafter, the back data BD is recorded up to the address position AD 13. The write pointer WP is temporarily set at the address position AD 13, but it will be shifted to the address position AD 11, etc., for example, to prevent the back data BD from being overwritten with other data.

The read data RD is transferred to the host 51 before being overwritten and erased by the back data BD. The HDD 1 executes reading of the read data RD from the sub-buffer 412 in parallel with writing of the back data BD to the sub-buffer 412. Then, the read pointer RP is set at the AD 12, whereby reading of the read data RD is initiated. Thereafter, all read data RD that are stored in the space from the address position AD 12 to AD 13 is transferred to the host 51.

The buffer control shown in FIG. 5 shows more complicated control than the example shown in FIG. 4, and front data FD will be recorded in the additional space 413 in addition to the back data BD that is stored in the sub-buffer 412. As a result, the front data FD can also be kept in the read buffer 241 as cache data in addition to the back data BD. Here, to leave and keep all back data BD, the additional space 413 can have the size longer than the data length of the front data FD. However, to prevent existing cache data from being erased as much as possible, it is preferable that the capacity of the additional space 413 should coincide with the data length of the front data FD.

The HDD 1 according to the embodiment determines whether the read buffer 241 is used as a whole or only the partial continuous space 411 thereof is used. As a preferable judgment criterion, the HDD 1 according to the embodiment determines a method for using the read buffer 241 based on the data length of data read from the magnetic disk 11 in responding to a read command. The HDD 1, when the data length of data read from the magnetic disk 11 is larger than a reference value, determines to use a partial continuous space. One of the values used for the reference value is a free space in the read buffer 241. The read buffer 241 will be used as a whole when a sufficient free space is available in the read buffer 241 and the read data from the magnetic disk 11 can be stored therein.

A prescribed fixed value can be used as the reference value. For example, it is determined to use a partial continuous space when a sufficient free space does not exist and the data length of data to be read is larger than the fixed value. With such an arrangement, it is possible to leave and keep the existing cache data and improve the cache hit rate.

One of the preferable values is the capacity of the read buffer 241. The HDD 1 determines to use a partial continuous space when the data length of data to be read from the magnetic disk 11 is larger than the whole capacity of the read buffer 241. Since all existing cache data in the read buffer 241 will be overwritten and erased by the data to be read, it is preferable to leave and keep part of cache data in terms of the cache hit rate. Likewise, it is one of the preferable modes to select a fixed value among values indicating about 50% or over of the capacity of the read buffer 241. In this case, the HDD 1 can make judgment with a fixed value only, or by using both of a free space and a fixed value. More specifically, the HDD 1 can determine to use a partial continuous space when the data length is larger than the free space and the fixed value.

When the data length is smaller than the free space and the fixed value, the read buffer 241 is used as a whole. With such an arrangement, also in the case where the control shown in FIG. 4 is carried out, it is ensured to leave and keep the front data in the read buffer 241 as cache data. When the data length of read data is short, it frequently occurs that a request for the front data is made by the host 51 in succession. To this end, by leaving and keeping the front data as cache data, it is possible to improve the cache hit rate. In addition, when a partial continuous space is used like the control as shown in FIG. 5, for example, the data FD and BD to be cached anew will not be lined up in the order of LAB. As a result, two or more cache tables will be used for one command, which deteriorates operating efficiency of cache tables. When the data length is short, there is a smaller amount of existing cache data to be overwritten, and it is preferable to use the read buffer 241 as a whole from the viewpoint of efficient table operations.

Here, data to be read from the magnetic disk 11 includes front data FD, read data RD and back data BD. The front data FD and the back data BD can be set as a fixed data length or can be made variable according to data length of read data. Usually, the front data FD is read after completion of seek of the read data RD on a recording track. Therefore, when the time from seek completion to arrival of a head to the read data RD is short, the front data FD will become short. In other words, the HDD 1 is unable to know the data length of the front data FD correctly at the time of seek start. To this end, the HDD 1 according to the embodiment determines a method for using the read buffer 241 by using an expected value of data length to be read. It is possible to specify the maximum length of the front data FD to be read, and the maximum length (specified value) can be used as an expected data length of the front data FD.

Figure 6:
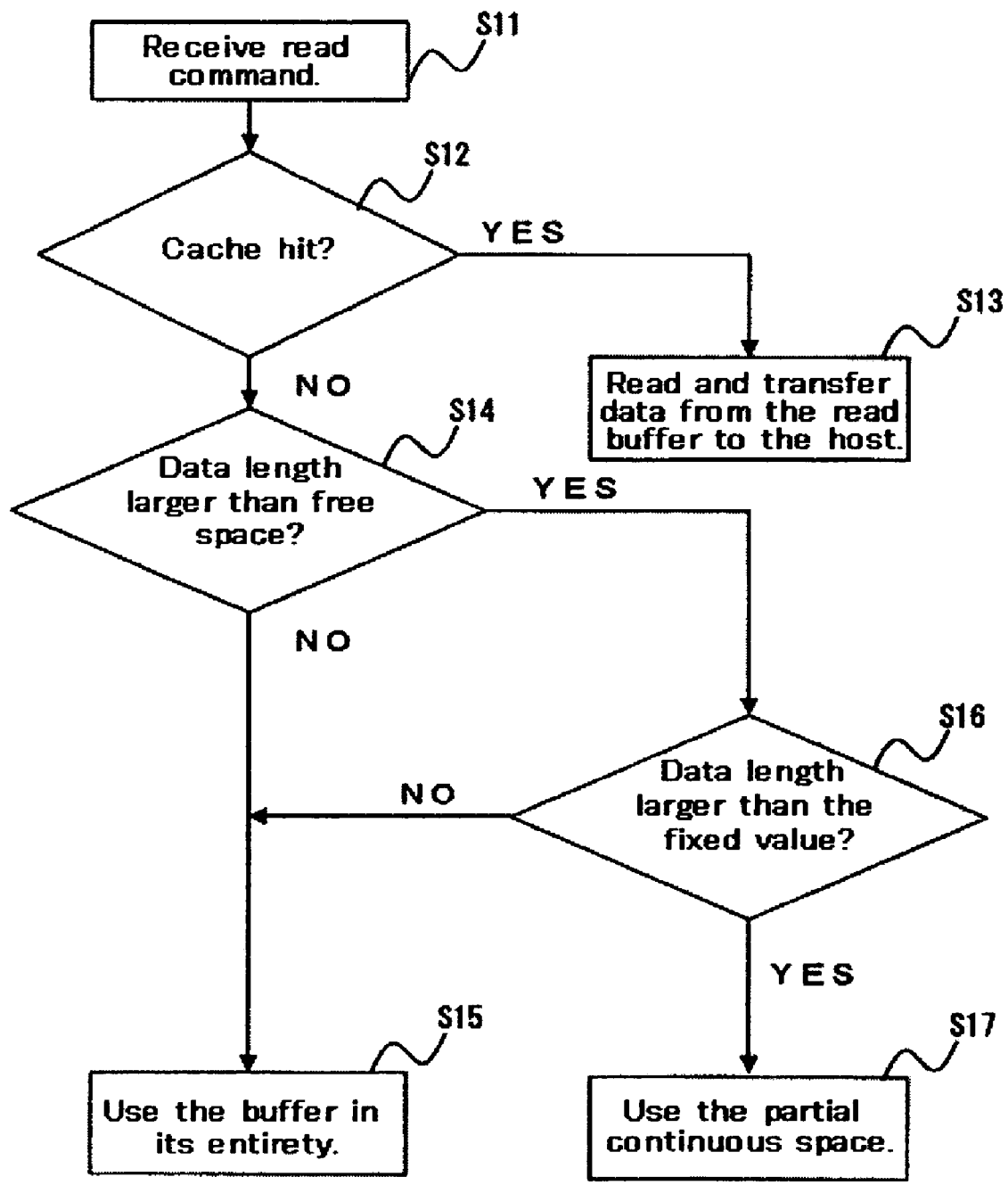
FIG. 6 is a flow chart showing a control sequence of a read buffer according to an embodiment of the invention.

Hereinafter, an example of a process by the HDD 1 to determine a method of using the read buffer 241 will be described with reference to FIG. 6. In step S11, upon receiving a read command, the HDD 1 judges whether or not associated read data is stored in the read buffer 241 (cache hit judgment) (S12). For the case of a cache hit judgment, the HDD 1 transfers data in the read buffer 241 to the host 51 (S13).

If the associated read data is not stored in the read buffer 241, the HDD 1 judges whether the expected read data length is larger than the free space of the read buffer (S14). When the data length is smaller than the free space, the HDD 1 determines to use the read buffer 241 as a whole (S15). On the other hand, if the HDD 1 judges that the data length is larger than the free space in step S14, the HDD 1 judges whether the data length is larger than a fixed value (fixed reference value) such as the buffer capacity (S16). When the data length is larger than the fixed value, the HDD 1 determines to use a partial continuous space (S17). When the data length is equal to or smaller than the fixed value, the HDD 1 determines to use the read buffer 241 as a whole (S15).

Further, for the case of sequential read, the HDD 1 uses a partial continuous space to read data from the magnetic disk 11. For the case of sequential read, the data read is sequentially transferred together with back data to the host 51. With such an arrangement, by using the sub-buffer 412 and overwriting the transferred data with new read data, it is possible to reduce the amount of existing cache data to be erased, thus improving the cache hit rate. Here, the sequential read shall imply a read process of data that is sequential to read data addresses of the previous read command, or a read command thereof.

For the case of sequential read, the read data thereof is in some cases contained in the back data BD that was already read before from the magnetic disk 11. For example, when data is read from the magnetic disk 11 in accordance with the previous read command of the sequential read command, read data of the current sequential read is contained in the back data. Consequently, for the case of sequential read, data is read from the magnetic disk 11 when the read data is not contained in the back data that was already read from the magnetic disk 11.

Figure 7:
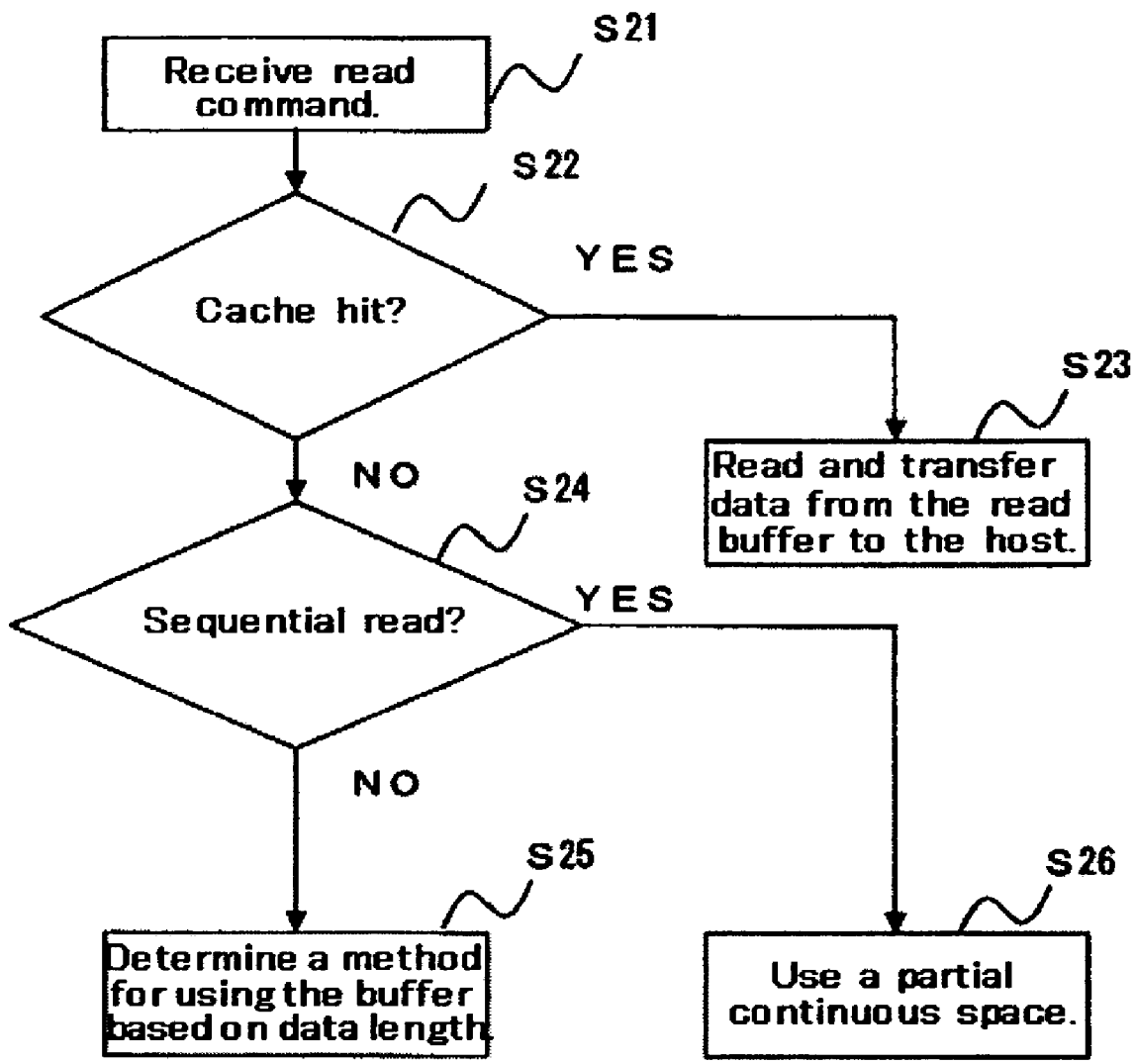
FIG. 7 is a flow chart showing a control sequence of a read buffer according to an embodiment of the invention.

Hereinafter, an example of a process by the HDD 1 to determine a method of using the read buffer 241 for the case of sequential read will be described with reference to FIG. 7. In step S21, upon receiving a read command, the HDD 1 judges whether or not the associated read data is stored in the read buffer 241 (cache hit judgment) (S22). For the case of a cache hit judgment (YES in step S22), the HDD 1 transfers data in the read buffer 241 to the host 51 (S23). When associated read data is not stored in the read buffer 241 (NO in step S22), the HDD 1 judges whether or not the read command is sequential read (S24). When the command is not sequential read (NO in step S24), the HDD 1 determines a method for using the buffer based on data length (S25). When the command is sequential read (YES in S24), the HDD 1 determines use of a partial continuous space (S26).

When data is read from the magnetic disk 11 for sequential reading, the HDD 1 uses a partial continuous space. The HDD 1 can use a partial continuous space of either mode described by referring to in FIG. 4 or FIG. 5. For example, when a higher priority is given to existing cache data, or to make control thereof easier, the HDD 1 selects a buffer configuration wherein the partial continuous space 411 and the sub-buffer 412 can coincide with each other as shown in FIG. 4. On the other hand, when it is preferable to leave and keep the front data as cache data, it is possible to achieve buffer control by using the mode shown in FIG. 5.

When using only part of the continuous space, the HDD 1 defines the space in the read buffer 241 and further defines a sub-buffer within the defined space. The write start position (leading-end position) of the partial continuous space can be set at the trailing-end position or the write end position of data previously written from the magnetic disk 11 in order to facilitate control of the buffer. Alternatively, to improve the cache hit rate, it is possible to set the write start position of the partial continuous space in the space in which cache data having low priority is stored. The priority can be determined based on, for example, access frequency to the data from the host 51, or recording order of cache data in the read buffer 241 indicating that the data is old or new.

Figure 8:
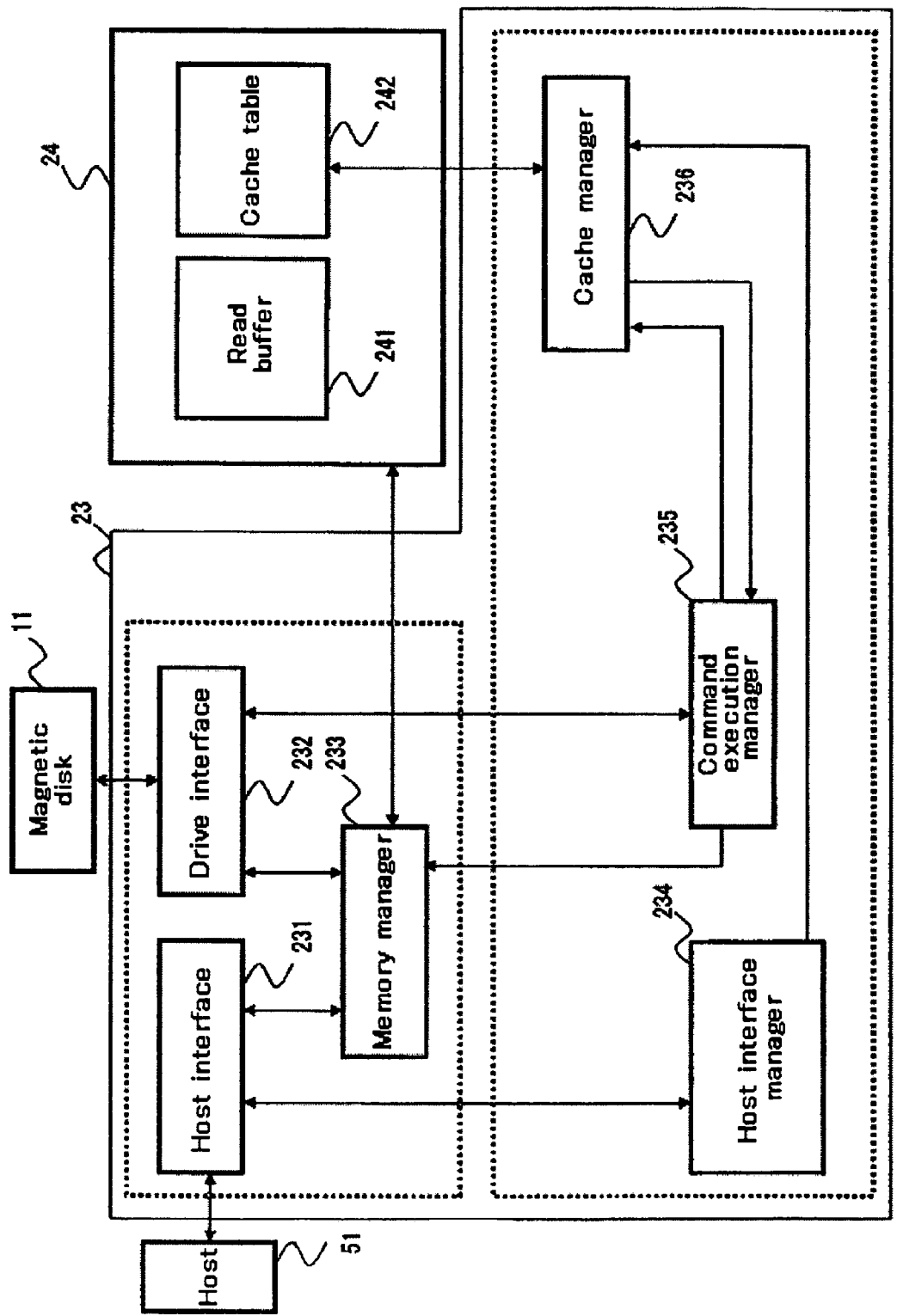
FIG. 8 is a block diagram showing a logical configuration related to read buffer control in an HDD according to an embodiment of the invention.

With the embodiment, the HDC/MPU 23 executes the above-stated control of the read buffer 241. To this end, read buffer control of the HDC/MPU 23 will be described hereunder in detail. FIG. 8 is a block diagram showing a configuration related to control of the read buffer 241 in the HDD 1. The HDC/MPU 23 includes, as a hardware configuration, a host interface 231, a drive interface 232 and a memory manager 233. As a microcode operates on an MPU, the MPU can function as a host interface manager 234, a command execution manager 235 and a cache manager 236. Likewise, a memory RAM 24 can function as the read buffer 241 and the cache table 242 by temporarily storing a command and data.

The host interface 231 executes actual data transfer processing with the host 51, thereby functioning as a data transfer unit. The drive interface 232 executes actual I/O data processing with the magnetic disk 11 (or the R/W channel 21). The memory manager 233 controls data memory of the RAM (memory) 24 and executes intermediate processing of various data between the other function blocks in the HDC/MPU 23 and the RAM 24.

The host interface manager 234 functions as a data transfer control unit that manages the host interface 231 and sends or receives a prescribed notification or a command to and from the host interface 231. The cache manager 236 sets a read pointer RP and a write pointer WP of the read buffer 241 by referring to the cache table 242. Further, the cache manager 236, when using a partial continuous space in the read buffer 241, executes setups of the partial continuous space and the sub-buffer. The command execution manager 235 controls execution of a command according to an instruction from the cache manager 236. Further, the command execution manager 235 controls data writing and data reading to and from the magnetic disk 11 by controlling the driver interface 232.

Here, it should be noted that information on data stored in the read buffer 241 is registered in the cache table 242. More specifically, identification numbers, LBAs, data lengths, start positions (addresses) in the read buffer 241, etc. for respective data are registered as shown in FIG. 9. Here, each data can be registered, for example, in the manner that a series of addresses having sequential LBA are registered as one data unit. Referring to the example shown in FIG. 5, each of the above-stated information is registered in the cache table 242 for each of the front data FD and back data BD that are written anew. In addition, information such as the order that each data is recorded in the read buffer 241 and the number of times of cache hit in the past can be registered in the cache table.

Figure 10:
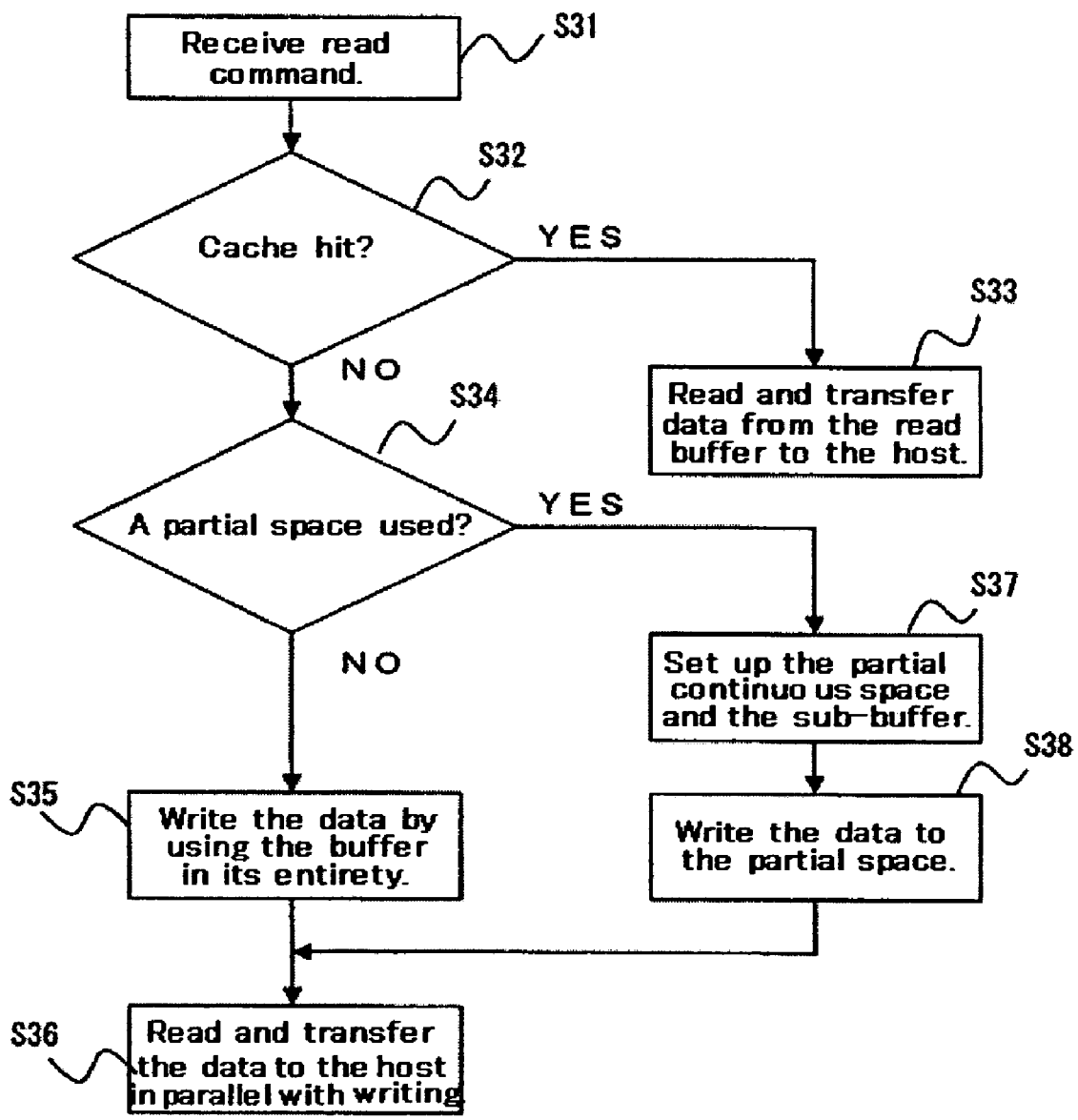
FIG. 10 is a flow chart showing a control sequence of a read buffer according to an embodiment of the invention.

Next, a control sequence of the read buffer 241 will be described with reference to a flow chart shown in FIG. 10. In step S31 in FIG. 10, when the host interface 231 receives a read command from the host 51, the read command is transferred to the cache manager 236. The cache manager 236, upon receiving the read command, judges whether or not the requested read data exists in the read buffer 241 by referring to the cache table (S32).

For the case of a cache hit judgment (YES in step S32), the cache hit manager 236 instructs the command execution manager 235 to execute read processing by designating the address and the data length of the read data to be read from the read buffer 241. The command execution manager 235 sets the read pointer and the data length in the register of the memory manager 233 and instructs the memory manager 233 to read the read data. The memory manager 233, responding to the instruction, reads the read data from the read buffer 241 and transfers the read data to the host 51 via the host interface 231 (S33).

When the read data does not exist in the read buffer 241 (NO in step S32), the cache manager 236 determines whether the read buffer 241 should be used as a whole or part of continuous space thereof for the data to be read from the magnetic disk 11 (S34). With such an arrangement, the cache manager 236 can determine a method for using the read buffer 241 in accordance with the above-stated judgment criteria.

When it is determined that the read buffer 241 is used as a whole (NO in step S34), the cache manager 236 instructs the command execution manager 235 to write the data read from the magnetic disk 11 to the read buffer 241 by designating the LBA range of data to be read from the magnetic disk 11, use of the read buffer 241 as a whole, and the write pointer position of the read buffer 241. The command execution manager 235 sets the information designated by the cache manager 236 in each register of the memory manager 233 and the drive interface 232. The drive interface 232 and the memory manager 233 record the data read from the magnetic disk 11 in the read buffer 241 according to the information set in the register (S35).

The command execution manager 235, upon acquiring information on the data length of front data from the drive interface 232, sets a read pointer in the memory manager 233 to transfer read data to the host 51. The memory manager 233, according to the read pointer thus set, reads the read data from the read buffer 241 and transfer the data to the host 51 (S36). Further, the information on front data is transferred to the cache manager 236, which then updates the cache table 242 by using the information on the front data and the information that has been already acquired.

When it is determined that only part of the continuous space of the read buffer 241 (YES in step S34), the cache manager 236 instructs the command execution manager 235 to write the data read from the magnetic disk 11 to the read buffer 241 by designating the LBA range of data to be read from the magnetic disk 11, the leading-end position and the trailing-end position of the partial continuous space, and the leading-end position and the trailing-end position of the sub-buffer (S37). Now, here, the write pointer position of the read buffer 241 will coincide with the leading-end position of the partial continuous space. The cache manager 236 thus can determine the leading-end position and the trailing-end position of each of partial continuous space and the sub-buffer.

The command execution manager 235 sets the information designated by the cache manager 236 in each register of the memory manager 233 and the drive interface 232. The drive interface 232 and the memory manager 233 record the data read from the magnetic disk 11 in the read buffer 241 according to the information set in the register. At this time, the memory manager 233 stores the data in the partial continuous space and the sub-buffer located therein (S38).

The command execution manager 235, upon acquiring information on the data length of front data from the drive interface 232, sets a read pointer in the memory manager 233 to transfer read data to the host 51. The memory manager 233, according to the read pointer thus set, reads the read data from the read buffer 241 and transfers the data to the host 51 (S36). Further, the information on front data is transferred to the cache manager 236, which then updates the cache table 242 by using the information on the front data and the information that was already acquired.

The description stated above is made just to explain embodiments according to the present invention, and therefore, the present invention is not limited to the above-stated embodiments. It is understood by those skilled in the art that elements of the foregoing embodiments can be easily changed, added or modified without departing from the spirit and scope thereof. For example, the write buffer control according to the embodiment can be applied to a data storage device that uses a recording medium other than a magnetic disk. Further, the buffer control according to the present invention can be applied to an HDD which does not perform prefetching or pre-reading as well as to an HDD which performs only prefetching or only pre-reading. Although it is preferable that the data storage device should include a read buffer and a write buffer independently, the buffer control according to the present invention can be applied to a buffer which stores both of write data and read data.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device that transmits read data read from a recording medium to a host, said data storage device comprising:
    a buffer having a leading end and a trailing end coupled to each other and enabling continuous recording of data from a write start position designated by a pointer; and
    a controller configured to control data recording to the buffer;
    wherein the controller:
    determines whether the buffer should be used as a whole or a part of continuous space of the buffer should be used to read the read data from the recording medium;
    specifies, if using the part of continuous space is determined, a sub-buffer which is a continuous space formed by coupling a leading-end position and a trailing-end position to each other; and
    executes writing of data from the recording disk to the sub-buffer in parallel with reading of the read data to the host.

2. A data storage device according to claim 1,
    wherein said sub-buffer and said part of continuous space coincides with each other.

3. A data storage device according to claim 2,
    wherein the data to be read from said recording medium contains, in addition to read data to said host, back data that is stored in a back position of the read data in said recording medium, and a capacity of said sub-buffer coincides with a data length of said back data.

4. A data storage device according to claim 1,
    wherein the data to be read from said recording medium contains, in addition to read data to said host, back data that is stored in a back position of the read data in said recording medium, and a capacity of said sub-buffer is smaller than data to be read from said recording medium and is larger than a data length of said back data.

5. A data storage device according to claim 1,
    wherein the data to be read from said recording medium contains, in addition to read data to said host, back data that is stored in a back position of the read data in said recording medium, and a capacity of said sub-buffer coincides with a data length of said back data.

6. A data storage device according to claim 1,
    wherein the data to be read from said recording medium contains, in addition to read data to said host, back data that is stored in a back position of the read data in said recording medium as well as the front data that is stored in a front position of the read data in said recording medium;
    a capacity of said sub-buffer exceeds a data length of said back data;
    said front data is written in a front space of said sub-buffer; and
    said back data is written after the read data is written in said sub-buffer.

7. A data storage device according to claim 1,
    wherein said data storage device includes a write buffer to store write data from said host, in addition to said buffer to store data from said recording disk.

8. A data storage device according to claim 1,
wherein said controller determines to use said part of continuous space when an expected data length of data to be read from said recording medium is larger than a reference value.

9. A data storage device according to claim 8,
wherein the data to be read from said recording medium contains read data to said host, back data which is stored in succession to a back position of the read data in said recording medium as well as the front data that is stored in a front position of the read data in said recording medium.

10. A data storage device according to claim 8,
wherein said reference value is a predetermined fixed value and the value is chosen among values indicating about 50% or over of a capacity of said buffer.

11. A data storage device according to claim 1,
wherein said controller determines to use said part of continuous space when an expected data length of data to be read from said recording medium is larger than a capacity of said buffer.

12. A data storage device according to claim 1,
wherein said controller determines to use said part of continuous space when an expected data length of data read from said recording medium is larger than a capacity of said continuous free space located next to an end position of previous data writing to said buffer and the data length is larger than a reference value.

13. A data storage device according to claim 1,
wherein said controller uses the fact that a command associated with said read data is sequential read as one of criteria for determining the use of said part of continuous space in said buffer.

14. A data storage device according to claim 1,
wherein said data storage device reads back data stored in a back position of the read data in said recording medium together with read data to be transmitted to said host from said recording disk; and
wherein said controller determines, when at least part of read data of sequential read is not contained in back data at the time of previous data reading from a recording disk, to use the part of continuous space in said buffer for reading the read data of the sequential read from said recording disk.

15. A control method of a data storage device which includes a buffer having a leading end and a trailing end coupled to each other and enabling continuous recording of data from a write start position as designated by a pointer, the method comprising:
receiving a read command from a host;
determining reading read data associated with said read command from a recording medium;
determining whether the buffer should be used as a whole or a part of continuous space in the buffer should be used to store data, including said read data, read from said recording medium;
writing data, when it is determined to use said part of continuous space, from said recording medium to a sub-buffer which is a continuous space formed by coupling a leading-end position and a trailing-end position to each other as defined within the part of continuous space; and
in parallel with the data writing to said sub-buffer, reading said read data from the sub-buffer to said host.

16. A control method of a data storage device according to claim 15,
wherein it is determined whether said buffer should be used as a whole or a part of continuous space in said buffer is used, based on data length of data to be read from said recording medium.

17. A control method of a data storage device according to claim 15,
wherein the data to be read from said recording medium contains, in addition to the read data to said host, back data stored in a back position of the read data in said recording medium, and a capacity of said sub-buffer should coincides with a data length of said back data.

18. A control method of a data storage device according to claim 15,
wherein the data to be read from said recording medium contains, in addition to the read data to said host, back data stored in a back position of the read data in said recording medium and front data stored in a front position of the read data in said recording medium; and
wherein a capacity of said part of continuous space is at least a value which is the sum of a data length of said back data and a data length of said front data.

19. A control method of a data storage device according to claim 15,
wherein the data to be read from said recording medium contains, in addition to read data to said host, back data that is stored in a back position of the read data in said recording medium as well as the front data that is stored in a front position of the read data in said recording medium;
a capacity of said sub-buffer exceeds a data length of said back data;
said front data is written in a front space of said sub-buffer; and
said back data is written after the read data is written in said sub-buffer.

20. A control method of a data storage device according to claim 15, further comprising:
determining to use said part of continuous space when an expected data length of data to be read from said recording medium is larger than a reference value.

* * * * *